(12) United States Patent
Chen

(10) Patent No.: US 6,595,095 B2
(45) Date of Patent: Jul. 22, 2003

(54) PIVOTABLE HANDLE AND ANGLE ADJUSTABLE DEVICE FOR MITER SAW

(75) Inventor: Ruey-Zon Chen, Tali (TW)

(73) Assignee: Rexon Industrial Corp., Ltd. (TW)

( * ) Notice: Subject to any disclaimer, the term of this patent is extended or adjusted under 35 U.S.C. 154(b) by 69 days.

(21) Appl. No.: 09/832,951

(22) Filed: Apr. 12, 2001

(65) Prior Publication Data

US 2002/0148336 A1 Oct. 17, 2002

(51) Int. Cl.⁷ .............................................. B23D 19/00
(52) U.S. Cl. ............................. 83/473; 83/581; 83/490
(58) Field of Search ....................... 83/473, 581, 471.3, 83/490; 30/519

(56) References Cited

U.S. PATENT DOCUMENTS

| 135,628 | A | * | 2/1873 | Clemson ...................... 30/519 |
| 264,017 | A | * | 9/1882 | Winterbottom .............. 30/519 |
| 1,151,078 | A | * | 8/1915 | Young .......................... 30/519 |
| 1,531,131 | A | * | 3/1925 | Price ............................ 30/519 |
| 2,575,296 | A | * | 11/1951 | Rogers ........................ 30/519 |
| 5,016,510 | A | * | 5/1991 | Gardner ...................... 83/471.3 |
| 5,129,300 | A | * | 7/1992 | Kawakami .................. 83/471.2 |
| 5,347,902 | A | * | 9/1994 | Brickner et al. ............ 83/468.3 |
| 5,595,124 | A | * | 1/1997 | Wixey et al. ................. 83/581 |
| 5,778,747 | A | * | 7/1998 | Chen ........................... 83/471.3 |
| 5,937,720 | A | * | 8/1999 | Itzov ............................ 83/397 |
| 6,314,853 | B1 | * | 11/2001 | Omi et al. .................... 83/743 |

* cited by examiner

Primary Examiner—Kenneth E. Peterson
Assistant Examiner—Omar Flores Sanchez
(74) Attorney, Agent, or Firm—Bacon & Tomas, PLLC

(57) ABSTRACT

A miter saw. The saw includes a base on which a scale disk is connected and a bench is rotatably connected on the disk. An angle position device is connected to the bench. Notches are defined in an underside of the scale disk and the angle position device is engaged with one of the notches. A position member is movably connected to the body of the angle position device and a lever is connected to the position member which is pushed to contact a periphery of the scale disk to position the scale disk. A connection member is connected to the bench and a circular saw assembly is pivotally connected to the connection member. A handle on the circular saw assembly can be pulled out and rotated to adjust an angle thereof.

5 Claims, 7 Drawing Sheets

PIVOTABLE HANDLE AND ANGLE ADJUSTABLE DEVICE FOR MITER SAW

FIELD OF THE INVENTION

The present invention relates to a miter saw wherein the angle of the handle connected to the circular saw assembly is adjustable and the bench of the miter saw can be pivoted and positioned at desired angle.

BACKGROUND OF THE INVENTION

A conventional miter saw is shown in FIG. 8 and generally includes a base 60 with a disk 65 connected thereon and scale marks are marked on the disk 65. A circular bench 62 is pivotally supported on the disk 65 and a handle 631 extends from the bench 62. A position device 63 is connected to the handle 631 and has a position member 632 which is engaged with one of notches 651 defined in an underside of the disk 65 so that the bench 62 can be pivoted and positioned at desired angle. A connection member 64 is connected to the bench 62 so that the circular saw assembly 70 is pivotally connected to the connection member 64. The circular saw assembly 70 has a blade 74 which is driven by a motor 71 and an arm 72 is connected to a shaft of the blade 74. A handle 73 is connected to the arm 72. A fence 61 is located on the bench 62 so that an object to be cut is guided on the fence 61. The bench 62 can only be positioned at certain angles where notches 651 are available and it is difficult to set the bench 62 at an angle where no notch 651 is available. The user has to hold the handle 631 firmly to maintain the position of the bench 62 and lower the blade 74 to check the object will be cut at desired position. Besides, the handle 73 is fixed so that it cannot be satisfied by different users.

SUMMARY OF THE INVENTION

The primary object of the present invention is to provide a miter saw which has a handle that is rotated and positioned at a desired angle so as to meet different users' needs.

Another object of the present invention is to provide a miter saw which has a position member connected to the angle position device, wherein the position member is pushed by operating a lever to contact against a periphery of the scale disk to position the scale disk.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
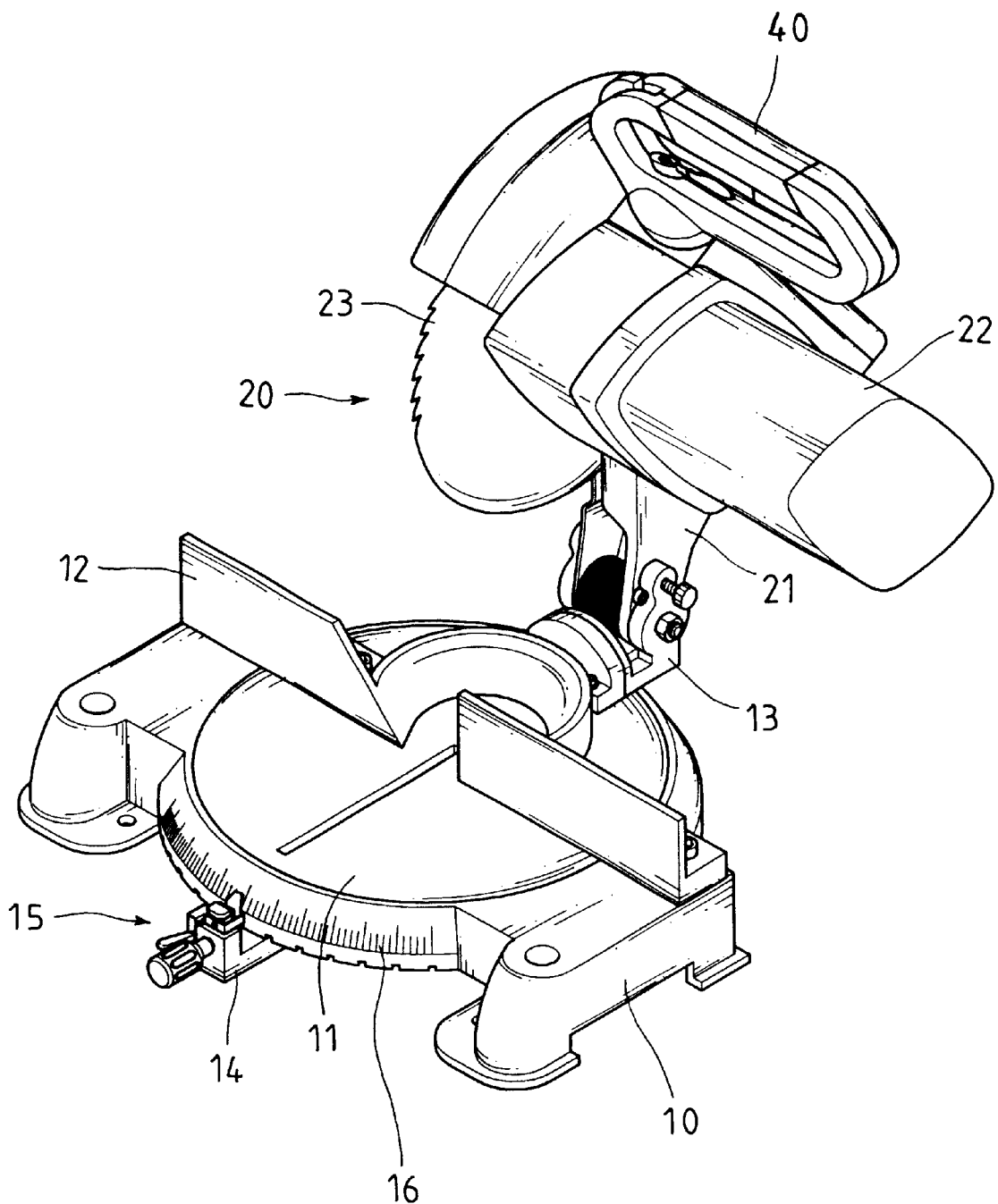
FIG. 1 is a perspective view to show the miter saw of the present invention.
Figure 2:
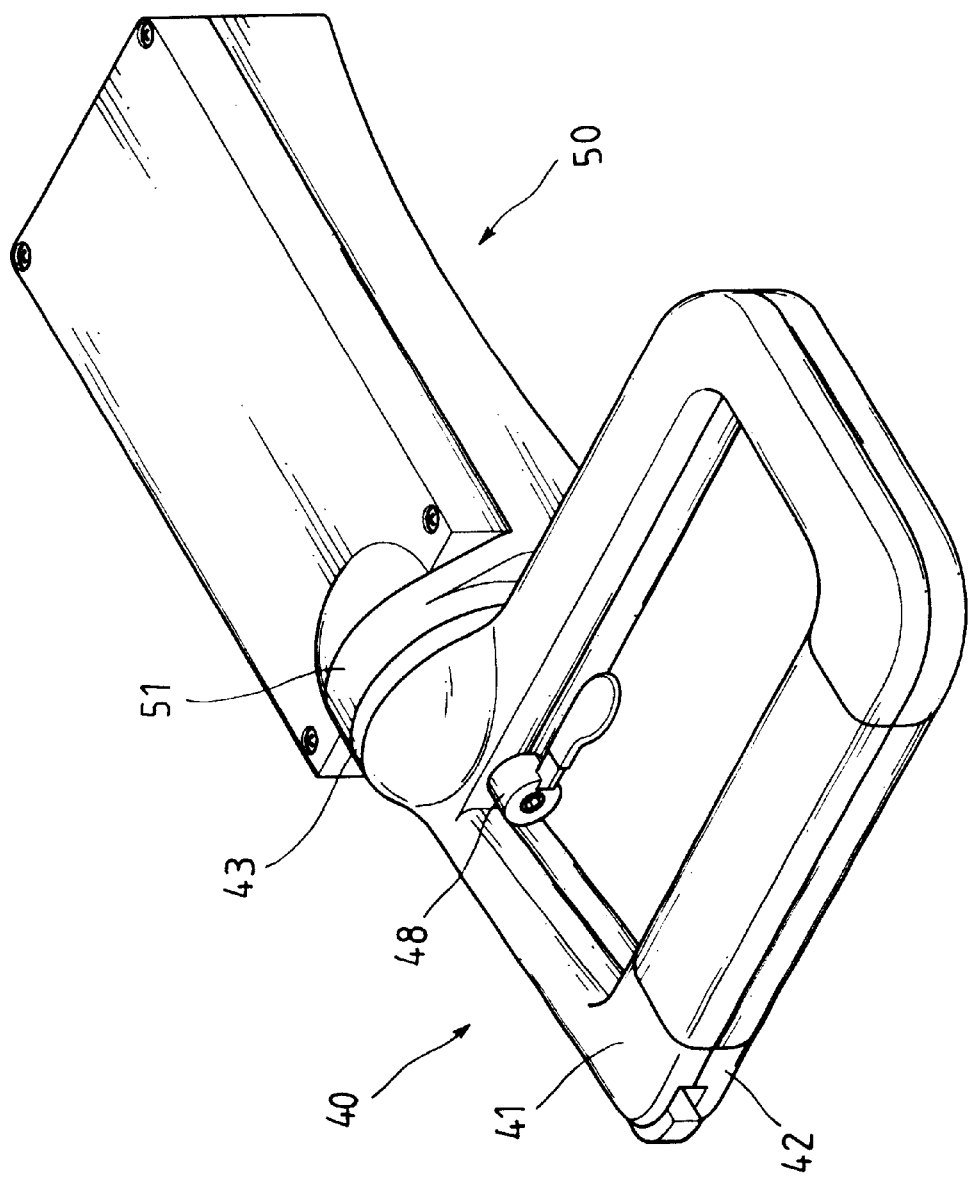
FIG. 2 is a perspective view to show the angle adjustable handle on the circular saw assembly of the miter saw of the present invention.
Figure 3:
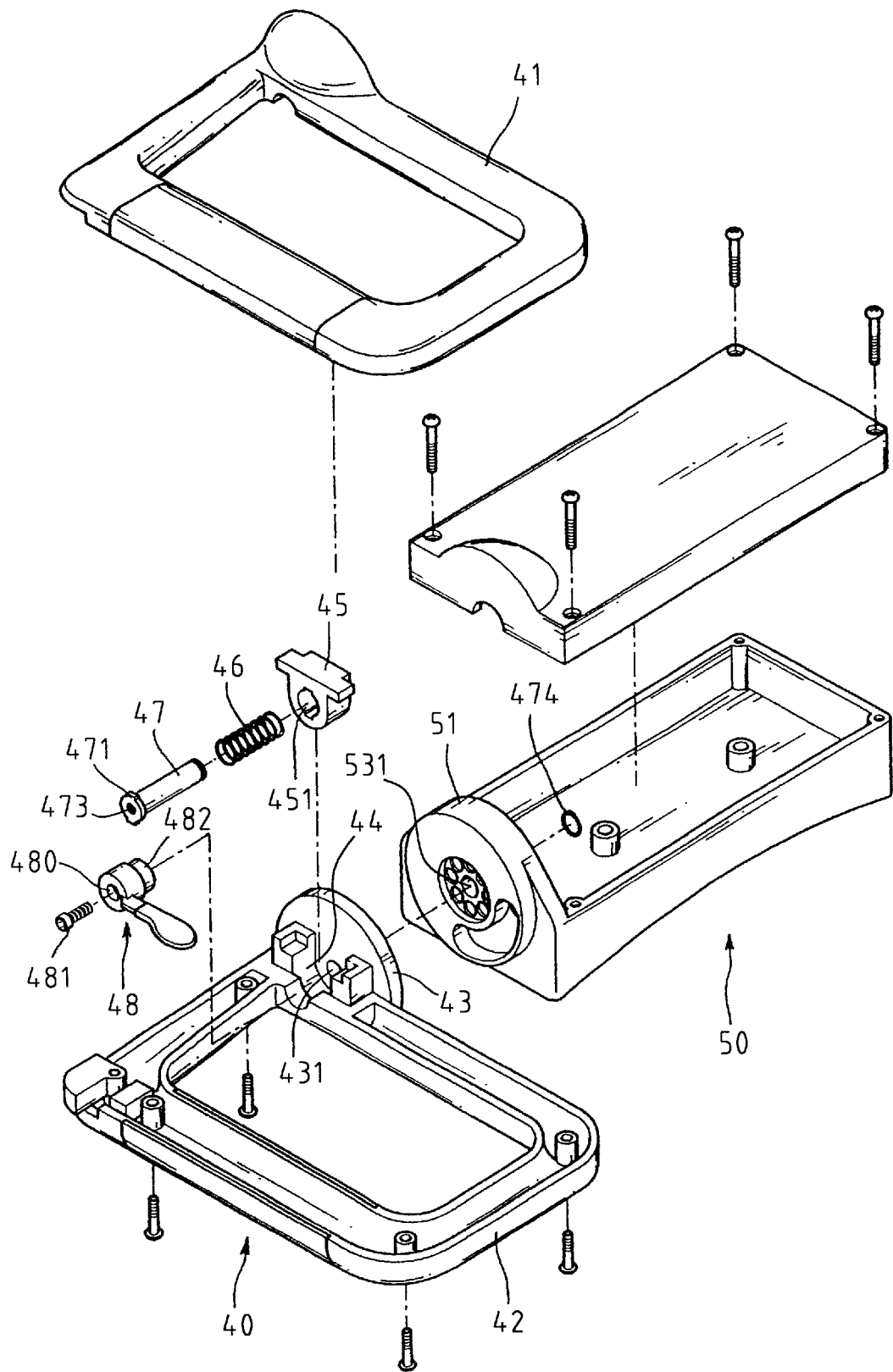
FIG. 3 is an exploded view to show the angle adjustable handle on the circular saw assembly of the miter saw of the present invention.
Figure 4:
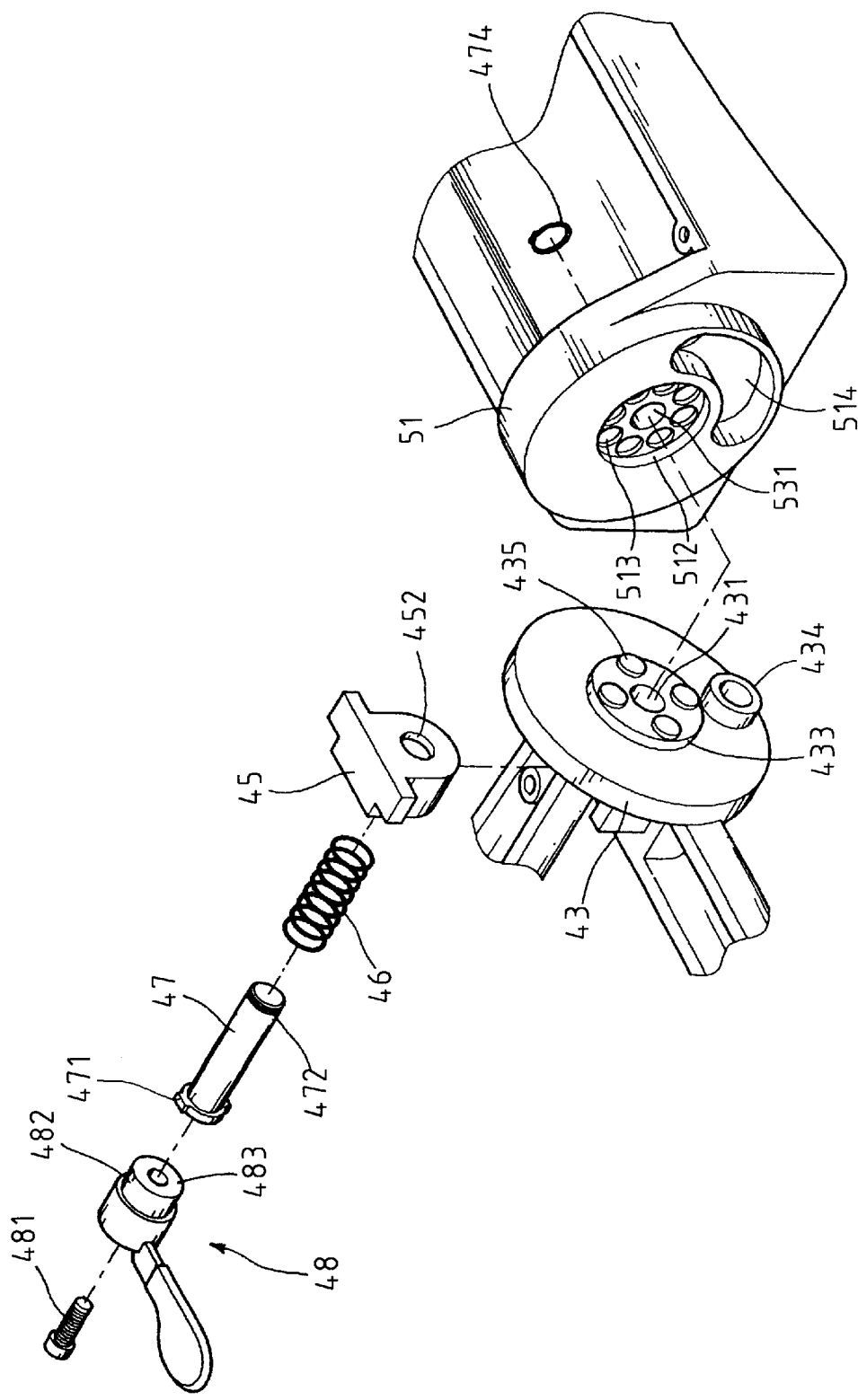
FIG. 4 is an exploded view to show the angle adjustable handle on the circular saw assembly of the miter saw of the present invention from another position.

Referring to FIGS. 1 to 4, the miter saw of the present invention comprises a base 10 and a scale disk 16 is fixedly connected on the base 10. A bench 11 is rotatably connected on the disk 16 and an angle position device 14 is connected to the bench 11 from an underside of the bench 11. A fence 12 is located on the bench 11 so as to guide an object to be cut on the bench 11. A plurality of notches 161 defined in an underside of the scale disk 16 at positions where pre-chosen marks of angles are located. The angle position device 14 is engaged with one of the notches 161.

A connection member 13 is connected to the bench 11 and a circular saw assembly 20 is pivotally connected to the connection member 13 by an arm 21 connected therebetween. The circular saw assembly 20 includes a motor 22 and a circular blade 23 which is driven by the motor 22. A block 50 is fixedly connected to the arm 21 and a first connection port 53 is located on an end of the block 50. A recessed area 532 is defined in a surface of the first connection port 53. A first central hole 531 is defined through an inside of the recessed area 532 and a plurality of concavities 533 are defined in the inside of the recessed area 532.

A rectangular handle 40 composed of two halves 41, 42 has a second connection port 43 which has a protrusion 433 extending from a first surface thereof. The protrusion 433 is removably engaged with the recessed area 532 and a second central hole 431 is defined through the protrusion 433 and the second connection port 43. A plurality of rods 435 extend from the protrusion 433 and are engaged with the concavities 533. The number of the concavities 533 is more than the number of the rods 435. A groove 534 is defined in the surface of the connection port 53 and a position tube 434 extends from the first surface of the second connection port 43. The position tube 434 is movably received in the groove 534 so that the second connection port 43 is restricted to be rotated a limited angle relative to the first connection port 53 because the groove 534 limits the range of movement of the position tube 434.

An engaging recess 44 is defined in a second surface of the second connection port 43 and a seat member 45 is received in the engaging recess 44. A passage 451 is defined through the seat member 45 and communicates with the second central hole 431. A flange 452 extends from a periphery defining the passage 451. A pin 47 extends through the passage 451, the second central hole 431 and the first central hole 531. A clamp 474 is engaged with a groove 472 defined in a distal end of the pin 47 so as to prevent the pin 47 from dropping from the first central hole 531. A spring 46 is mounted to the pin 47 and biased between the flange 452 and a head 471 of the pin 47. A thread hole 473 is defined in the head 471 of the pin 47 and the head 471 of the pin 47 is sized to be movably received in the passage 451. A locking member 48 has a section 482 and an eccentric hole 480 is defined through the locking member 48 and the section 482. A bolt 481 extends through the eccentric hole 480 and is engaged with the thread hole 473. The locking member 48 is freely rotated about the bolt 481 and the section 482 is sized to be inserted in the passage 451. An eccentric convex surface 483 extends from a distal end of the section 482 and the eccentric convex surface 483 contacts the head 471 of the bolt 47.

When rotating a handlebar on the locking member 48 to a locking position, because the eccentric hole 480 is located eccentrically in the section 482 so that a central axis of the section 482 is shifted away from a central axis of the passage 451 and the pin 47. The highest point of the eccentric convex surface 483 firmly urges the head 471 of the pin 47 so that the handle 40 cannot be pulled away from the block 50 because the seat member 45 is stopped by the section 482. On the contrary, when rotating the locking member 48 to an unlock position, the central axis of the section 482 is shifted to coincide with the central axis of the passage 451 and the pin 47. The peak point of the eccentric convex surface 483 is then removed from the head 471 of the pin 47 so that the handle 40 can be pulled away from the block 50 and the head 471 of the pin 47 and the section 482 are both received in the passage 451 as the seat member 45 is moved with the handle 40. The handle 40 is then able to be rotated an angle to let the rods 435 remove from the concavities 533 wherein the rods 435 were engaged to other concavities 533. By this way, the angle of the handle 40 can be adjustable.

Figure 5:
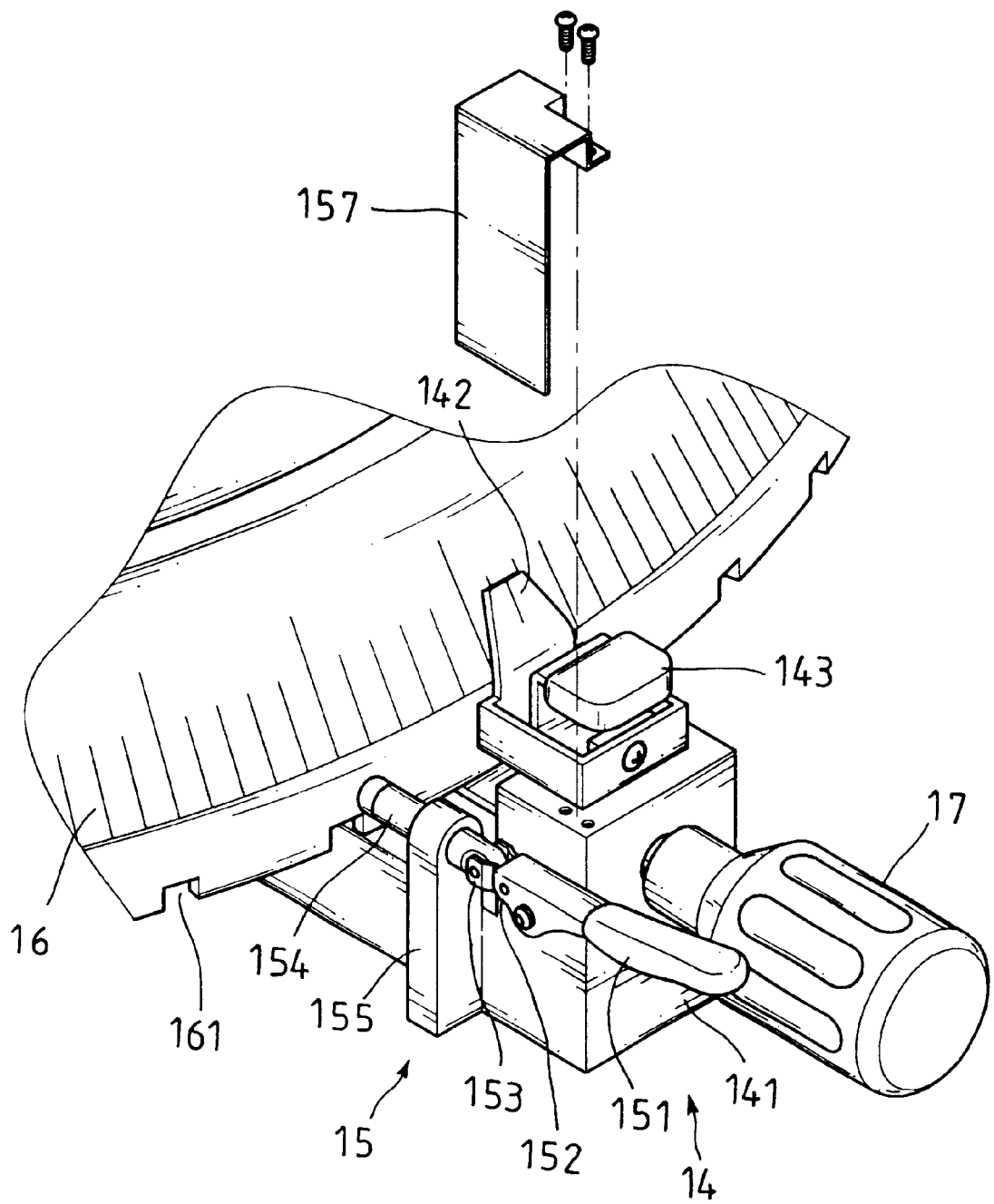
FIG. 5 is a perspective view to show the angle position device of the miter saw of the present invention.
Figure 6:
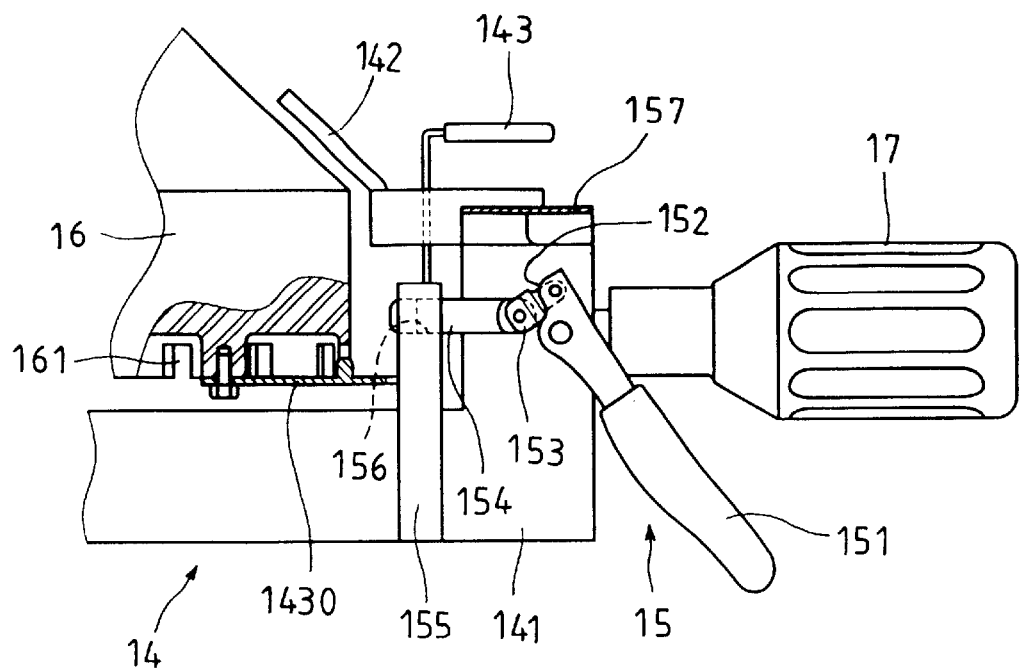
FIG. 6 is a side view to show that the position member of the angle position device is not pushed.
Figure 7:
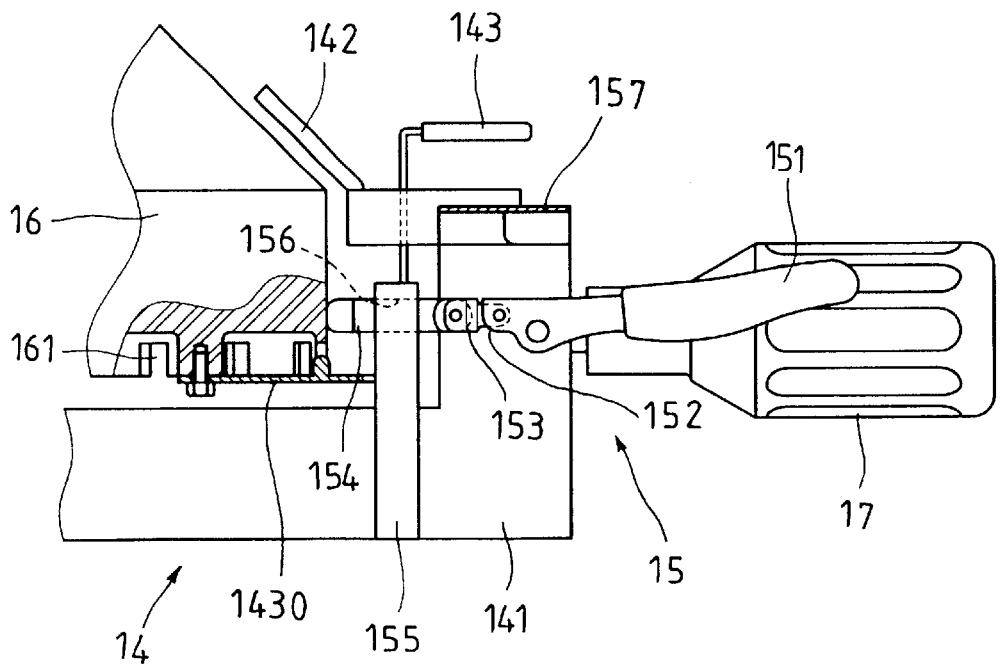
FIG. 7 is a side view to show that the position member of the angle position device is pushed by lifting the lever.
Figure 8:
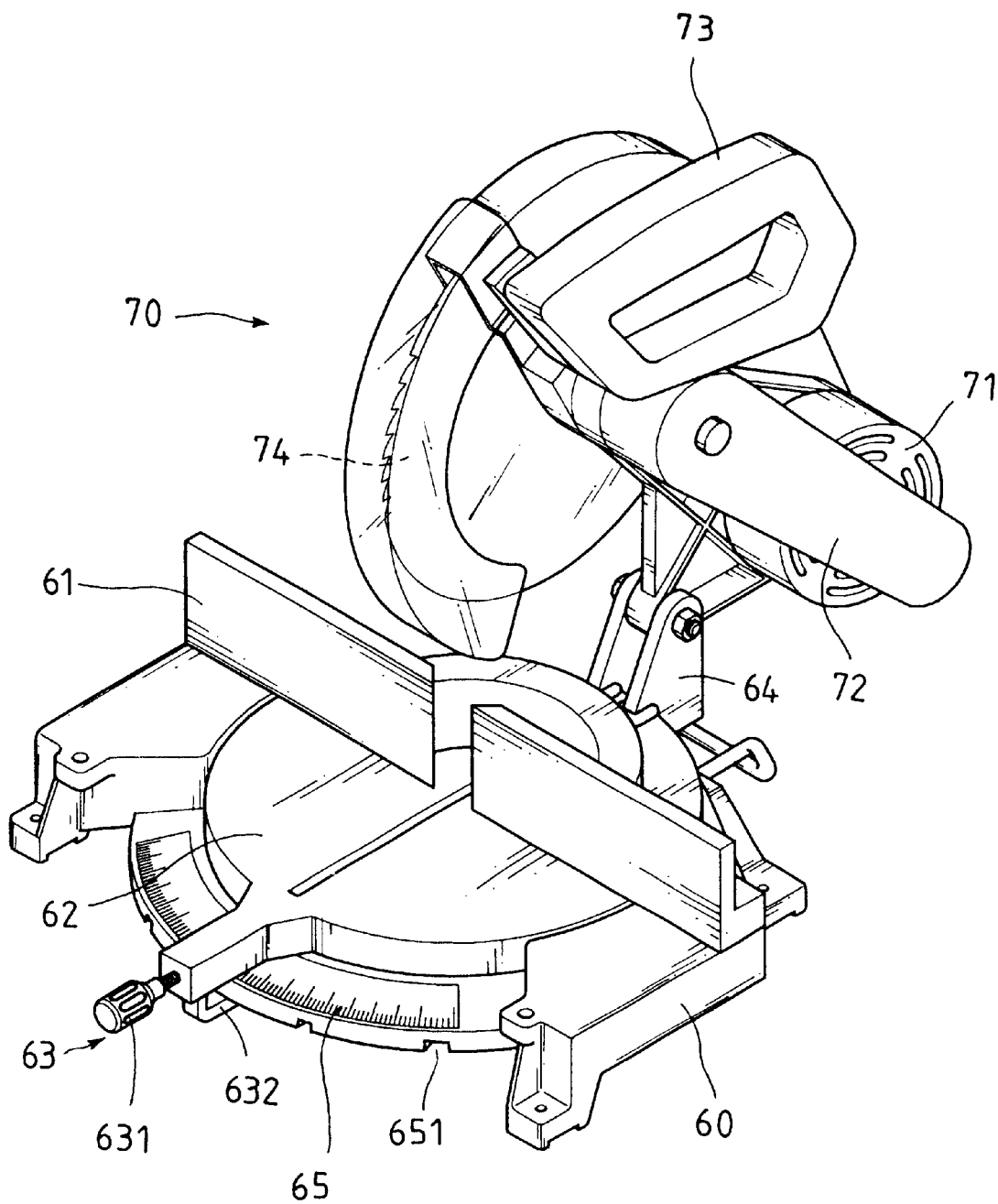
FIG. 8 is a perspective view to show a conventional miter saw.

Referring to FIGS. 5 to 7, the angle position device 14 has a position member 143 which vertically and movably extends through a body 141 of the angle position device 14 and a tongue 1430 is connected to the position member 143. The tongue 1430 can be lowered to disengage from one of the notches 161 when pushing the position member 143 when holding a handle 17 to rotate the bench 11. A point plate 142 is connected to the body 141 so as to provide an index mark to the scale disk 16. A scale disk holding device 15 is connected to the body 141 and includes a lever 151 pivotally connected to a body 141 of the angle position device 14. An eccentric portion 152 extends from an end of the lever 151 and a mediate member 153 is pivotally connected to the eccentric portion 152. A support member 155 is connected to the body 141 of the angle position device 14 and a position rod 154 movably extends through the support member 155. An end of the position rod 154 is pivotally connected to the mediate member 153 and the other end of the position rod 154 has a rubber end. A cover 157 is connected to the body 141 and encloses the connection between the position rod 154, the mediate member 153 and the lever 151.

When the lever 151 is not lifted, the rubber end of the position rod 154 does not contact the scale disk 16 as shown in FIG. 6. As shown in FIG. 7, when lifting the lever 151, the eccentric portion 152 pushes the position rod 154 to let the rubber end contact the periphery of the scale disk 16 and hold the scale disk 16. Therefore, the bench 11 can be rotated to any desired angle without engaging the tongue 1430 with the notch 161.

While we have shown and described the embodiments in accordance with the present invention, it should be clear to those skilled in the art that further embodiments may be made without departing from the scope of the present invention.

What is claimed is:

1. A miter saw comprising:
    a base and a scale disk connected on said base, a bench rotatably connected on said disk and a plurality of notches defined in an underside of said scale disk, an angle position device connected to said bench and having a tongue engaged with one of said notches, a lever pivotally connected to a body of said angle position device and an eccentric portion extending from an end of said lever, a mediate member pivotally connected to said eccentric portion, a support member connected to said body of said angle position device and a position rod movably extending through said support member, an end of said position rod pivotally connected to said mediate member and the other end of said position rod contacting a periphery of said scale disk when said lever is pivoted to push said position rod, and
    a connection member connected to said bench and a circular saw assembly pivotally connected to said connection member.

2. The miter saw as claimed in claim 1 further comprising a position member movably extending through said body of said angle position device, said tongue connected to said position member, said tongue being lowered to disengage from one of said notches when pushing said position member.

3. A miter saw comprising:
    a base and a scale disk connected on said base, a bench rotatably connected on said disk and an angle position device connected to said bench;
    a connection member connected to said bench and a circular saw assembly pivotally connected to said connection member, said circular saw assembly having a handle pivotably connected thereto;
    said circular saw assembly has a block to which said handle is pivotally connected, a first connection port located on an end of said block and a recessed area defined in a surface of said first connection port, a first central hole defined through an inside of said recessed area and a plurality of concavities defined in said inside of said recessed area;
    said handle having a second connection pot which has a protrusion extending from a first surface thereof, said protrusion removably engaged with said recessed area and a second central hole defined through said protrusion and said second connection port, a plurality of rods extending from said protrusion and engaged with said concavities, the number of said concavities being more than the number of said rods, a seat member connected to a second surface of said second connection port and a passage defined through said seat member, a flange extending from a periphery defining said passage, said passage communicating with said second central hole;
    a pin extending through said passage, said second central hole and said first central hole, a clamp connected to an end of said pin to prevent said pin from dropping from said first central hole, a spring mounted to said pin and biased between said flange and a head of said pin, a thread hole defined in said head of said pin and said head of said pin being sized to be movably received in said passage; and
    a locking member having an eccentric hole defined therethrough and a bolt extending through said eccentric hole and engaged with said thread hole, said locking member freely rotated about said bolt, a section extending from said locking member and said eccentric hole defined through said section which is sized to be inserted in said passage.

4. The miter saw as claimed in claim 3 further comprising a groove defined in said surface of said first connection port and a position tube extending from said first surface of said second connection port, said position tube movably received in said groove.

5. The miter saw as claimed in claim 3 further comprising an eccentric convex surface extending from a distal end of said section and said eccentric convex surface contact said head of said bolt.

* * * * *